March 28, 1961   N. A. R. ASP   2,977,002
APPARATUS FOR AUTOMATICALLY LOADING BAGS ON A PALLET
Filed Aug. 29, 1958   2 Sheets-Sheet 1
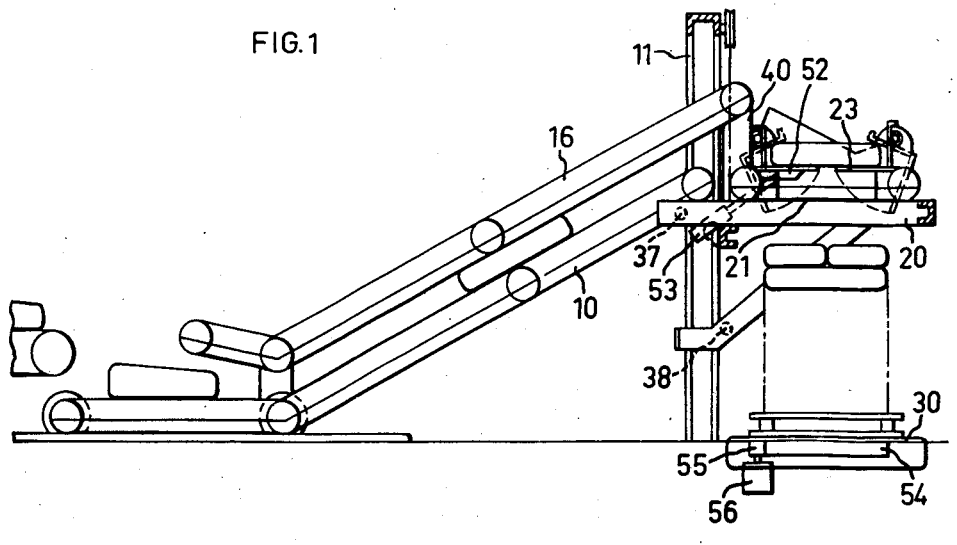
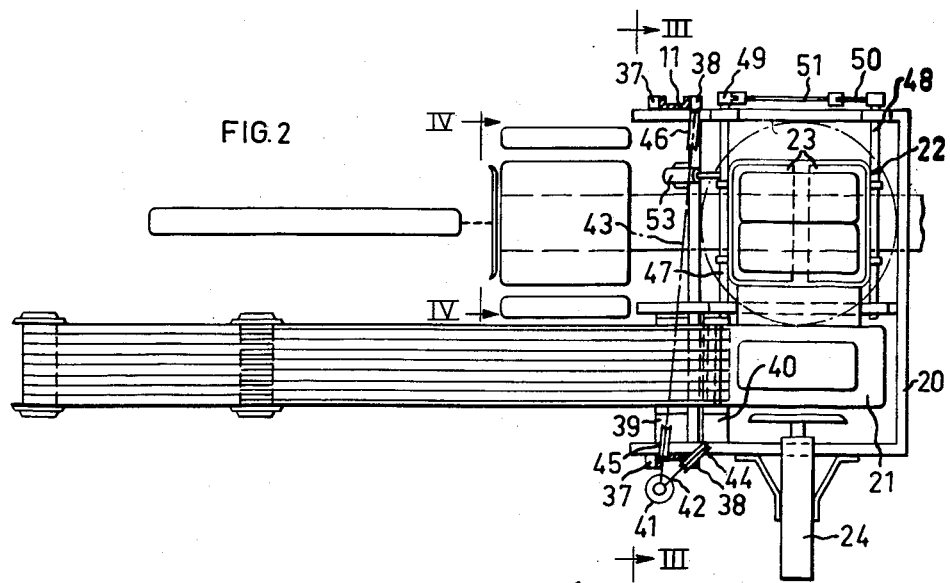
Inventor:
Nils A. R. Asp
By Wenderoth, Lind & Ponack
Attorneys March 28, 1961 N. A. R. ASP 2,977,002
APPARATUS FOR AUTOMATICALLY LOADING BAGS ON A PALLET
Filed Aug. 29, 1958
2 Sheets-Sheet 2

Inventor
Nils A. R. Asp
By
Wenderoth, Lind & Ponack
Attorneys

United States Patent Office 2,977,002
Patented Mar. 28, 1961

2,977,002

APPARATUS FOR AUTOMATICALLY LOADING BAGS ON A PALLET

Nils Axel Rudolf Asp, Svedala, Sweden, assignor to Aktiebolaget Abjorn Anderson, Svedala, Sweden, a corporation of Sweden Filed Aug. 29, 1958, Ser. No. 758,109

Claims priority, application Sweden Sept. 2, 1957

2 Claims. (Cl. 214—6)

This invention relates to an apparatus for automatically loading bags onto a pallet.

According to the invention, said apparatus comprises in combination an endless lifting conveyor which is more or less inclined in its longitudinal direction and the upper end of which is vertically movable and mounted for pivotment in a frame about a horizontal transverse axis, while its lower end is substantially horizontally movable on a support to permit the vertical movement of the upper end, a substantially horizontal endless conveyor joining and vertically movable together with the upper end of the lifting conveyor, said horizontal conveyor being arranged for conveying the bags from the upper end of the lifting conveyor, a substantially horizontal table vertically movable together with the conveyors and arranged laterally of the substantially horizontal conveyor, the supporting surface of the table being substantially coplanar with the supporting surface of the horizontal conveyor and formed by one or more swingable members, movable shutters or the like to permit depositing one or more bags, which are placed on said table, on a pallet beneath said table or on an incomplete pile of bags already deposited on said pallet, means vertically movable together with the conveyors and the table for transferring the bags from the substantially horizontal conveyor to said table, means for turning or displacing the pallet after a predetermined number of bags have been deposited thereon, and means for vertically raising the vertically movable elements a distance corresponding to the bag thickness after each layer of bags has been completed on said pallet.

These and other features of the invention will become apparent from the following description, reference being had to the accompanying diagrammatic drawings, in which:

Figure 1 is a side elevation of the bag loading apparatus.

Fig. 2 is a top view of the apparatus in Fig. 1.

Figure 3:
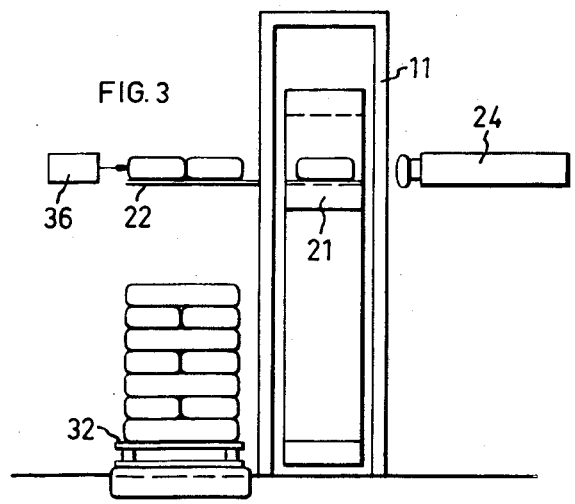
Fig. 3 is a view on line III—III in Fig. 2.
Figure 4:
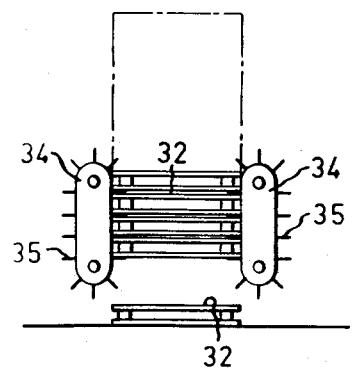
Fig. 4 is a view on line IV—IV in Fig. 2.

In Figures 1 and 2 there is shown a carriage 20 which is guided for vertical movement in the frame 11 by rollers 37 and 38 engaging opposite sides of the frame 11. The carriage supports the horizontal conveyor 21, the table 22 and the ram 24, which are all mounted on the carriage for movement therewith as are also the upper ends of the conveyors 10 and 16 by brackets 39 and 40, respectively. For moving the carriage 20 up and down in the frame 11 there is mounted on the frame a hydraulic or pneumatic cylinder 41 connected to each side of the carriage by a wire rope 42 and 43, respectively, the wire rope 42 running over a sheave 44, journaled on the frame, and the wire rope 43 running over two sheaves 45 and 46, also journaled on the frame.

The members 23 forming the supporting surface of the table are pivoted to the carriage by horizontal shafts 47 and 48, respectively, said shafts being provided with arms 49 and 50 at one end thereof. These arms are interconnected by a link 51. The angular position of arms 49 and 50 is such that the opening or closing movement of one of the members 23 is transmitted over the arms and the link to the other member as an opening and closing movement, respectively. One of the members 23, the left member in Figure 1, is provided with a flange-like arm 52 rigidly connected therewith, which is coupled to a hydraulic or pneumatic cylinder 53 mounted on the carriage 20 for opening and closing the table by swinging the members 23 simultaneously over arms 49, 50 and 52 and link 51.

Turntable 30 is provided with a gear 54 meshing with a pinion 55 on the shaft of an electric or other motor 56 for rotating the turntable.

The illustrated apparatus for automatically loading bags onto a pallet comprises an endless lifting conveyor 10 which is more or less inclined in its longitudinal direction and the upper end of which is vertically movable and mounted for pivotment in a frame 11 about a horizontal transverse axis, while the lower end of the conveyor is so connected with a horizontal conveyor 12 that it is pivotal at this end, likewise about a horizontal transverse axis. Said transverse axes preferably coincide with the upper and lower guide roller axis, respectively, of the conveyor 10. The horizontal conveyor 12 is provided with flanged wheels 13 which run on rails 14 on a horizontal base 15, for instance the floor of a warehouse or the like, to permit longitudinal displacement of the conveyor 12 and the lower end of the conveyor 10 when the upper end of the conveyor 10 is raised and lowered in the frame 11. A conveyor 16 is arranged in parallel with the conveyor 10 at a preferably adjustable distance therefrom and can be moved together with said conveyor 10 without changing its relative position thereto. The lower end of the conveyor 16 joins a conveyor 17 which extends freely from said lower end and which together with the conveyor 12 forms an inlet passage or hopper that diverges from the passage between the conveyors 10 and 16. All the said conveyors preferably consist of endless V-belts, but they may of course be designed in any other manner. A conveyor 18 which is associated with a conveying system of any desired type has its one freely extending end situated above the conveyor 12 in such a way that in all positions of the latter it permits depositing a bag from the conveyor 18 on the conveyor 12.

The upper end of the conveyor 10 is pivotally mounted on a carriage 20 which in turn is guided for vertical movement in the frame 11 and carries a further, substantially horizontal conveyor 21 which is preferably in the form of an endless belt conveyor joining the upper or delivery end of the conveyor 10 to receive and forward bags from said conveyor. A horizontal table 22, likewise supported by the carriage 20, is located laterally of the conveyor 21, and the supporting surface of said table is coplanar with that of the conveyor 21. The supporting surface of the table is formed by two members 23 which are normally held in the position shown by full lines but can be swung to the positions shown by dash lines in Fig. 1. A hydraulic or pneumatic piston motor 24 is mounted on the carriage 20 on the side of the conveyor 21 facing away from the table 22 to transfer bags from the conveyor 21 to the table 22.

Mounted directly beneath the table 22 is a turntable 30 which carries a section of rails 31 which are also arranged on the base 15 for guiding pallets 32 from a pallet magazine in under said table 22 and from there to any desired conveying system for the continued handling of the pallets. Said turntable 30 permits turning a pallet 32 beneath the table 22 in order to place the bags which are lowered from said table 22 in a given pattern on said pallet 32. Each layer on the pallet 32 may consist for instance of two bags, and after a layer has been deposited the turntable 30 can be turned through 90° so that the bags in the pile will lie in a pattern that can be termed cross bracing.

The pallets 32 can be moved in under the table 22 by a pneumatic or hydraulic piston motor 33. A pallet that has been lowered onto the rails 31 from a pallet magazine including two vertical endless conveyors 34 which are spaced apart horizontally and have horizontal ribs or rails 35 on which a number of pallets are supported in a position bridging the space between the conveyors 34, can be moved from its position beneath the conveyors 34 along the rails 31 in under the table 22 by said piston motor 33. At the same time a pallet fully loaded with bags can be moved from its position beneath said table to be handled in any suitable manner for continued transport.

The carriage 20 may furthermore include means for inserting between the uppermost bag layers a paper sheet which holds the pile together on the pallet.

According as the pile on the pallet increases in height, the carriage 20 which at the beginning of the loading should be situated as closely as possible to the pallet 32 beneath the table 22 in order that the bags need not be lowered from too great a height and thus risk to be damaged, must be raised in the frame 11 a distance corresponding to the bag thickness after each layer has been completed, and again lowered to its lowermost position after a pile has been completed. Means for producing these movements of the carriage 20 are not shown in detail in the drawings, as such means can be designed in many different ways and are also easily provided by those skilled in the art without detailed directions.

Raising of the carriage 20 stepwise, swinging of the members 23 and turning of the turntable 30 can easily be controlled electrically, for instance by means of a switch 36, which is situated on the side of the table 22 facing away from the conveyor 21 and which has sensing means projecting inwardly over the table, said switch being actuated when a predetermined number of bags, in the present instance two bags, have been loaded onto the table 22. Actuation of said switch initiates an operating cycle comprising swinging the members 23 to open position (shown by dash lines) to lower the bags, swinging the members 23 back to the position shown by full lines, turning the turntable 30 through a predetermined angle, and raising the carriage 20 a distance corresponding to the bag thickness. Sensing means which are operatively connected with hydraulic or pneumatic valves or with switches which are connected to solenoids actuating such valves, can be arranged in the path of motion of the bags along the conveyor 10 or conveyor 21 for actuation of the piston motor 24 when a bag is located precisely opposite said motor so that it transfers the bag from the conveyor 21 to the table 22 during its operating stroke and then returns to its position of rest shown in the drawings. Means, for example a photo cell arrangement or the like, can also be provided for actuation of the piston motor 33 after the pile on the pallet 32 beneath the table 22 has reached a suitable height, so that the piston motor 33 moves the loaded pallet out from under said table simultaneously as a new pallet is moved in under the table 22, as well as for actuation of the pallet magazine so that a new pallet is supplied, and the drive of the carriage 20 so that the latter is lowered after the piston motor 33, having performed its operating stroke, has returned to its midposition shown in the drawings. A system for coordinating these different movements in the apparatus is not shown in detail but will easily be realized by those skilled in the art of relays and hydraulic devices.

From the above description it is easily understood how the apparatus functions, but for the sake of completeness a brief account of the function of the apparatus will now be given.

The bags arriving on the conveyor 18 to the apparatus are delivered to the conveyor 12 which moves them into the passage between the conveyors 12 and 17 so that they are gripped also by the latter conveyor 17 whereby the conveyors 12 and 17 together urge the bags into the passage between the conveyors 10 and 16. Should a bag not be of uniform thickness before then, it is flattened during the subsequent lifting thereof by the action of the conveyors 10 and 16. The bags are then fed onto the conveyor 21 from which they are moved onto the table 22, according as they arrive opposite the piston motor 24. After two bags have been placed on the table, the switch 36 is actuated so that by opening of the members 23 the bags are deposited on the pallet 32 beneath the table in case this pallet has just been moved in under the table 22 and the carriage thus is in its lowermost position, or on an incomplete pile of bags already situated on the pallet, whereafter the members 23 are closed again, the turntable 30 turned through 90° and the carriage 20 raised one step corresponding to a bag thickness. This continues until the pile is complete, when the piston motor 33 supplies a new pallet from the pallet magazine while simultaneously moving the loaded pallet from its position beneath the table 22. The piston motor 33 then returns to its initial position, a pallet is lowered from the pallet magazine in position opposite the piston motor 33, and the carriage 20 is lowered to its lowermost position for repeating the procedure described and initiating a new operating cycle.

The invention can be modified within the scope of the invention. Thus, instead of the turntable 30 there may be provided means for moving the pallet or for both turning and moving the pallet. In addition, the members 23 can be replaced by movable shutters, and another arrangement than that described can be used for supplying and removing the pallets. The invention is not therefore restricted merely to the embodiment illustrated.

What I claim and desire to secure by Letters Patent is:

1. An apparatus for automatically loading bags onto a pallet, comprising a frame, a carriage guided for vertical movement in said frame, means for moving the carriage in the frame, an endless lifting conveyor inclined in its longitudinal direction having its upper end mounted in said carriage for pivotment about a horizontal transverse axis, said upper end being vertically movable together with said carriage, a support for the lower end of the lifting conveyor, said lower end being substantially horizontally movable on said support to permit the vertical movement of the upper end, a substantially horizontal endless conveyor on the carriage, joining the upper end of the lifting conveyor, said horizontal conveyor being arranged for conveying bags from the upper end of the lifting conveyor longitudinally thereof, a substantially horizontal table on the carriage, disposed laterally of the substantially horizontal conveyor and having a supporting surface which is substantially coplanar with the supporting surface of that conveyor and is openable to deposit at least one bag from the table onto a pallet beneath said table, means on the carriage for transferring bags from the substantially horizontal conveyor transversely thereof to said table, and means for shifting the pallet after a predetermined number of bags have been deposited thereon.

2. An apparatus as claimed in claim 1 wherein a mobile, substantially horizontal conveyor joins the lower end of said lifting conveyor and is movable together therewith.

References Cited in the file of this patent

UNITED STATES PATENTS

| | | |
|---|---|---|
| 2,703,182 | Brogerg et al. | Mar. 1, 1955 |
| 2,748,957 | Segur | June 5, 1956 |
| 2,795,312 | Howdle | June 11, 1957 |